April 23, 1957 J. P. MADDEN 2,789,420
LIMIT TORQUE COUPLING
Filed June 1, 1955 2 Sheets-Sheet 1
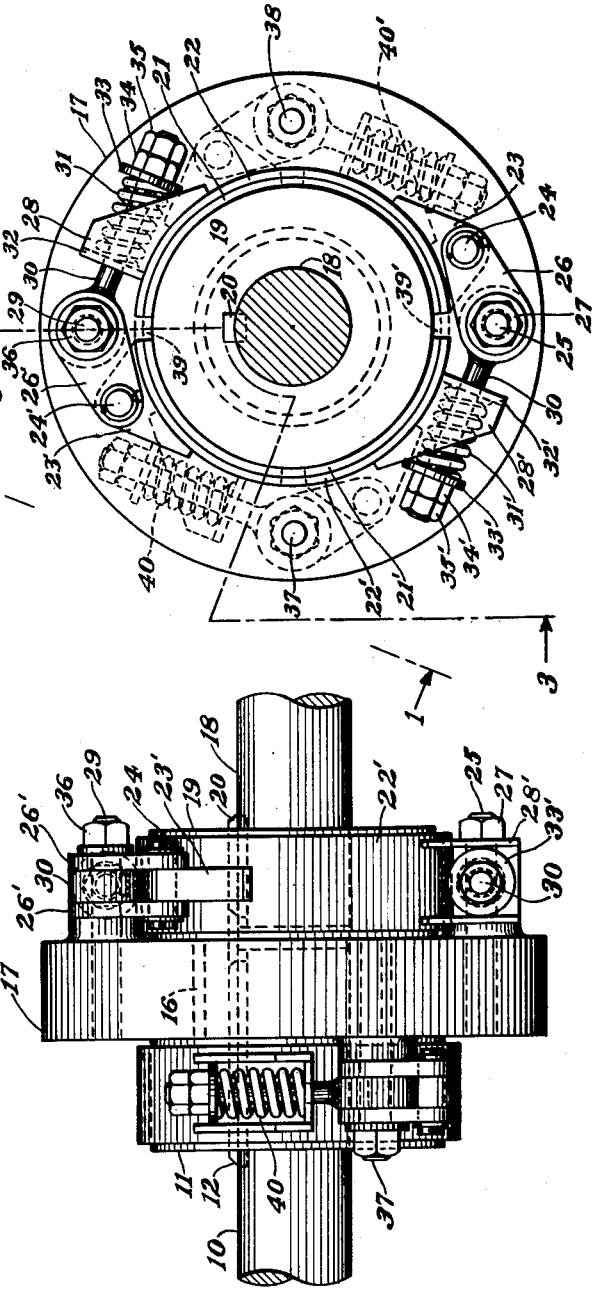
INVENTOR
James P. Madden
BY
ATTORNEY April 23, 1957   J. P. MADDEN   2,789,420
LIMIT TORQUE COUPLING
Filed June 1, 1955   2 Sheets-Sheet 2

INVENTOR
James P. Madden
BY
ATTORNEY

United States Patent Office 2,789,420
Patented Apr. 23, 1957

2,789,420

LIMIT TORQUE COUPLING

James P. Madden, Bethlehem, Pa.

Application June 1, 1955, Serial No. 512,511

6 Claims. (Cl. 64—30)

My invention is directed to improvements in limit torque couplings, i. e. couplings which limit the torque that can be transmitted by one shaft to another.

An object of my invention is to provide a coupling which will function as a positive drive until the torque limit for which it is set has been reached, at which load it will slip while continuing to exert the predetermined torque.

Another object of my invention is to provide a coupling which will slip at a predetermined torque regardless of the direction of rotation of the shafts.

Another object of my invention is to provide a coupling in which the torque at which slip occurs can be varied.

Another object of my invention is to provide a coupling which is adjustable so that the torque at which slip occurs during rotation of the shafts in one direction can be varied from the torque at which slip will occur during rotation of the shafts in the opposite direction.

Other objects of my invention will be apparent from the following description and from the drawings appended hereto.

In the drawings:

Figure 1 is a side elevation of a limit torque coupling embodying my invention taken on the line 1—1 of Fig. 2;

Fig. 2 is an end elevation of the coupling;

Figure 3:
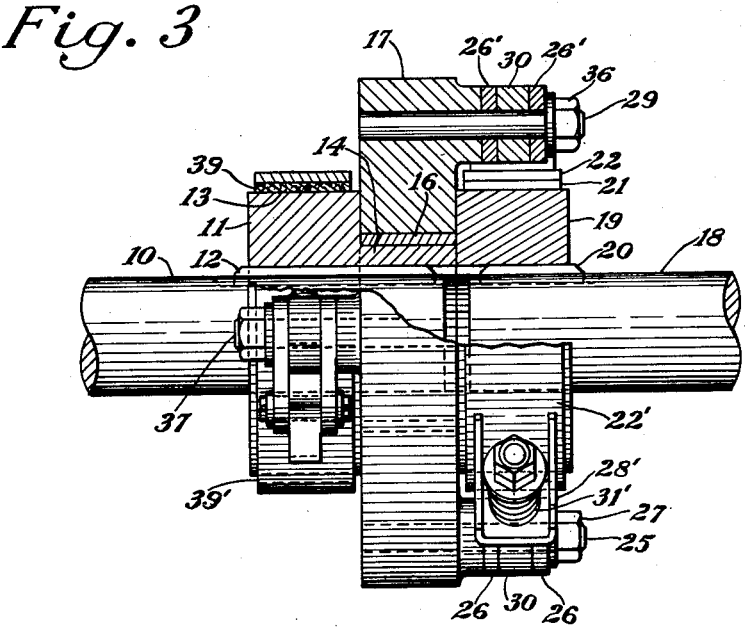
Fig. 3 is a view partly in side elevation and partly in section taken on the line 3—3 of Fig. 2.

Referring to Figs. 1, 2, and 3, the numeral 10 shows a shaft on while the pulley 11 is secured by key 12. Pulley 11 is provided with face 13 and shoulder 14. Mounted on the shoulder 14 is a bushing 16 and a hub member 17 which is rotatable on bushing 16. Shaft 18 is located in axial alignment with shaft 10 and has pulley 19 secured thereto by key 20, which pulley abuts or is located closely adjacent to the hub member 17.

Mounted on hub member 17 are friction means engaging pulleys 11 and 19, which means will now be described.

The friction means engaging pulley 19 can best be understood by referring to Fig. 2 and consist of the friction bands 21 and 21' each of which encircles substantially one-half of the circumference of pulley 19. The friction band 21 is secured to backing member 22. At one end of backing member 22 is a bracket 23 which carries pin 24. A stud 25 projects from the face of hub 17 and bracket 23 is secured to said stud by means of links 26 mounted on stud 25 and pin 24. Nut 27 retains said links 26 on stud 25. Bracket 28 is secured to the opposite end of backing member 22. Stud 29 projects from the face of hub 17 diametrically opposite stud 25. Eyebolt 30 is mounted on stud 29 and carries spring 31, which is retained between shoulder 32 on bracket 28 and the washer 33 and locknuts 34 and 35. A nut 36 on the end of stud 29 retains eyebolt 30 thereon.

Friction band 21' is in all respects identical with friction band 21 and is mounted on studs 29 and 25 in the same manner as band 21. The same reference numerals are used with a prime symbol added to show corresponding elements, but a description thereof is deemed unnecessary.

Projecting from the opposite face of hub 17 are studs 37 and 38 on which friction bands 39 and 39' are mounted in frictional engagement with the outer face of pulley 11. These bands 39 and 39' and associated mechanism are identical with bands 21 and 21' and their associated mechanism and need not be further described.

The nuts 34 and 35 on the ends of eyebolt 30 can be adjusted so as to vary the compression of spring 31 and thus the force by which the band 21 engages pulley 19.

The operation of the clutch can now be described. Assume that 18 is the driving shaft and 10 the driven shaft. If driving shaft 18 is rotated in a clockwise direction as viewed in Fig. 2, the shaft 18, pulley 19, hub 17, pulley 11, and shaft 10 will rotate as a unit. If however the torque resistance on shaft 10 exceeds the limit for which the clutch has been set, a slight compression will take place in springs 31 and 31' relieving the pressure of bands 21 and 21' on pulley 19 and allowing slip to take place between said bands and pulley 19 (slippage will not take place between bands 39 and 39' and pulley 11 because of servo effect in the device). Thus, in the described condition, shaft 18 and pulley 19 will rotate as a unit, and bands 21 and 21' will slip on pulley 19.

If on the other hand driven shaft 18 is rotated in a counter clockwise direction, the entire device will rotate as a unit until the torque on the shaft 10 exceeds the predetermined limit. When this occurs, springs 40 and 40' will be slightly compressed and allow slip to take place between bands 39 and 39' and pulley 11.

Figure 4:
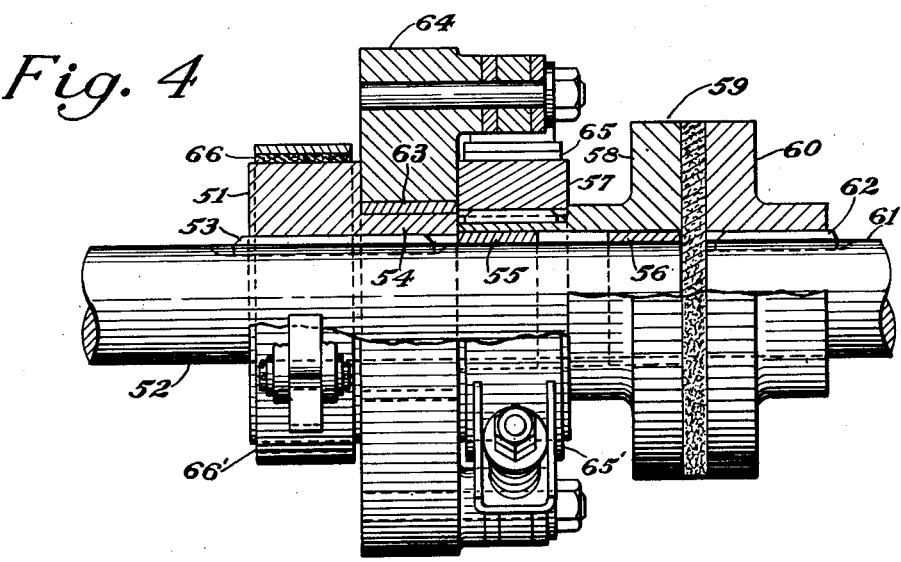
Fig. 4 is a view partly in side elevation and partly in section of a modified form of my invention.

Fig. 4 illustrates a modification of my invention which permits the use of flexible coupling between driving and driven shafts. In this modification pulley 51 is secured to shaft 52 by key 53 as in the device shown in Figs. 1, 2 and 3. Shaft 52 extends laterally beyond the shoulder 54 on pulley 51 and is provided with bushings 55 and 56. Pulley 57 is keyed to one element 58 of a standard flexible coupling 59 and pulley 57 and element 58 are rotatably mounted on bushings 55 and 56. The other element 60 of flexible coupling 59 is keyed to shaft 61 by key 62, so that shaft 61, flexible coupling 59 and pulley 57 are in effect a unitary structure.

Mounted on bushing 63 is hub 64 which carries friction bands 65, 65', 66 and 66'. These bands engage pulleys 57 and 51 respectively and are in all respects identical with the bands 21, 21' of Figs. 1, 2 and 3.

The modified device shown in Fig. 4 operates in essentially the same manner as that of Figs, 1, 2 and 3; that is, when shaft 61 is rotated in a clockwise direction viewed from the right of Fig. 4, the device will rotate as a unit until the torque for which it is set has been exceeded, in which event slip will take place between bands 65, 65' and pulley 57. If on the other hand shaft 61 is driven in a counterclockwise direction then, if the torque is exceeded, slip will take place between bands 66, 66' and pulley 51.

The device of Fig. 4, which embodies a flexible coupling 59, will compensate for misalignment between driving and driven shafts.

It will be observed that the device of Figs. 1, 2 and 3 can be adjusted so that slip will take place in one direction of rotation at a different torque than in the other direction of rotation. This is accomplished by imposing more or less compression on one pair of springs 31, 31' than on the other pair 40, 40'. This is useful in the operation of devices such as valves which require more torque to open than to close. In order to protect the driving members in motor driven valves, and to prevent damage to the valve, it is customary to provide some sort of safety device. If the coupling of the present invention is used, the bands which function to close the valve can be set to slip at a lower torque than the bands which function to open the valve.

The same adjustments can be made in the springs of the embodiment of Fig. 4.

Although the device of Figs. 1, 2 and 3 has been described with shaft 18 as the driving shaft and shaft 10 as the driven shaft, the device may be operated in like manner with shaft 10 as the driving shaft and shaft 18 as the driven shaft. The same thing is true of the device of Fig. 4.

I claim:

1. A limit torque coupling comprising a first shaft, a second shaft adjacent thereto and in axial alignment therewith, a first pulley member associated with said first shaft and rotatable therewith, a second pulley member associated with said second shaft and rotatable therewith, an intermediate hub member journalled between said first pulley member and said second pully member, a first friction element carried by said intermediate hub member and releasably engaging said first pulley member, and a second friction element carried by said intermediate hub member and releasably engaging said second pulley member.

2. A limit torque coupling comprising a first shaft, a second shaft, a first pulley member associated with said first shaft and rotatable therewith, a second pulley member associated with said second shaft and rotatable therewith, a hub member journalled on said first shaft intermediate said pulley members, a first friction band, means securing one end of said friction band to said hub member, tension means carried by said hub member and urging the other end of said first friction band into engagement with the periphery of said first pulley, a second friction band, means securing one end of said friction band to said hub member, and tension means carried by said hub member and urging the other end of said second friction band into engagement with the periphery of said second pulley.

3. Apparatus according to claim 2 in which said friction bands have the same direction of wrap from their points of securement to said hub members about the peripheries of their associated pulleys.

4. Apparatus according to claim 2 in which the tension means for each friction member can be varied.

5. A limit torque coupling comprising a first shaft, a first pulley mounted on said shaft and rotatable therewith, a second shaft, a second pulley mounted on said shaft and rotatable therewith, a hub member journalled on said first shaft intermediate said pulleys, friction bands secured at one end to said hub member and disposed about the peripheries of said pulleys, resilient means carried by said hub member for urging the other ends of said friction bands into engagement with said peripheries, and means for varying the force exerted by said resilient means.

6. A limit torque coupling comprising a first shaft, a first pulley mounted on said shaft and rotatable therewith, a second shaft, a second pulley, a flexible coupling connecting said second shaft and said second pulley, said second pulley being journaled on said first shaft, a hub member journalled on said first shaft intermediate said pulleys, friction bands carried by said hub member, springs for urging said friction bands into contact with the peripheries of said pulleys, and means for adjusting the amount of force exerted by said springs.

References Cited in the file of this patent

UNITED STATES PATENTS

| 971,335 | Williamson, Jr. | Sept. 27, 1910 |
| 1,601,438 | Gustafson | Sept. 28, 1926 |
| 2,300,720 | Wooldridge | Nov. 3, 1942 |